(12) United States Patent
Roth et al.

(10) Patent No.: US 7,963,828 B2
(45) Date of Patent: Jun. 21, 2011

(54) METHOD AND APPARATUS FOR PREPARING POULTRY CARCASSES FOR DEFEATHERING OPERATIONS

(75) Inventors: Nicholas A. Roth, Dakota Dunes, SD (US); Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 0 days.

(21) Appl. No.: 12/482,332

(22) Filed: Jun. 10, 2009

(65) Prior Publication Data
US 2010/0317271 A1 Dec. 16, 2010

(51) Int. Cl.
A22C 21/02 (2006.01)
(52) U.S. Cl. .......................................... 452/71
(58) Field of Classification Search .............. 452/71–75, 452/81, 125, 126, 198
See application file for complete search history.

(56) References Cited

U.S. PATENT DOCUMENTS

| | | | |
|---|---|---|---|
| 1,562,360 A | 11/1925 | Ottesen | |
| 2,214,562 A | 9/1940 | McCadam et al. | |
| 3,023,109 A | 2/1962 | Hines | |
| 3,664,146 A | 5/1972 | Butts | |
| 4,217,678 A | 8/1980 | Crawford et al. | |
| 4,220,669 A | 9/1980 | Townsend | |
| 4,292,889 A | 10/1981 | Townsend | |
| 4,766,646 A * | 8/1988 | Parker | 426/332 |
| 4,770,884 A | 9/1988 | Hill et al. | |
| 4,996,741 A | 3/1991 | Covell, III | |
| 5,012,728 A | 5/1991 | Langen et al. | |
| 5,082,679 A | 1/1992 | Chapman | |
| 5,093,140 A | 3/1992 | Watanabe | |
| 5,436,017 A | 7/1995 | Ludwig et al. | |
| 5,489,443 A | 2/1996 | Knipe et al. | |
| 5,520,575 A | 5/1996 | Dickson | |
| 5,605,503 A | 2/1997 | Martin | |
| 5,638,744 A | 6/1997 | Smith | |
| 5,664,488 A | 9/1997 | Smith | |
| 5,773,060 A | 6/1998 | Smith | |
| 5,807,598 A | 9/1998 | Liberman et al. | |
| 5,853,320 A | 12/1998 | Wathes et al. | |
| 5,871,795 A | 2/1999 | Roth | |
| 6,142,067 A | 11/2000 | Roth | |
| 6,168,510 B1 | 1/2001 | Ford | |
| 6,379,728 B1 | 4/2002 | Roth | |
| 6,387,426 B1 | 5/2002 | Roth | |
| 6,389,838 B1 | 5/2002 | Roth | |
| 6,406,728 B1 | 6/2002 | Roth | |
| 6,564,700 B2 | 5/2003 | Roth | |

(Continued)

FOREIGN PATENT DOCUMENTS

JP 58047429 A 3/1983

(Continued)

*Primary Examiner* — Thomas Price
(74) *Attorney, Agent, or Firm* — Russell D. Culbertson; The Culbertson Group, P.C.

(57) ABSTRACT

A process includes contacting a feathered poultry carcass with an ammonia-based treatment material to increase the pH at the skin of the carcass and thereby effect a loosening of the feathers on the carcass. After the contact with the ammonia-based treatment material, mild heat may be applied to the feathered carcass to further loosen the feathers. The prepared feathered carcass is then defeathered in a suitable defeathering process. Ammonia may be removed from the carcass before, after, and/or during defeathering. The defeathered carcass is then passed on for further processing to produce the final poultry product.

22 Claims, 6 Drawing Sheets

U.S. PATENT DOCUMENTS

| | | |
|---|---|---|
| 6,565,904 B2 | 5/2003 | Roth |
| 6,713,108 B2 | 3/2004 | Roth |
| 6,802,984 B1 * | 10/2004 | Perkins et al. ............... 210/754 |
| 6,899,908 B2 | 5/2005 | Roth |
| 6,946,080 B2 * | 9/2005 | Perkins et al. ............... 210/754 |
| 7,022,361 B2 | 4/2006 | Roth |
| 7,045,162 B2 | 5/2006 | Roth |
| 7,093,973 B2 | 8/2006 | Roth |
| 7,134,957 B2 | 11/2006 | Clayton et al. |
| 7,214,398 B2 | 5/2007 | Roth |
| 7,322,284 B2 | 1/2008 | Roth |
| 7,381,439 B2 | 6/2008 | Hilgren et al. |
| 2004/0147211 A1 | 7/2004 | Mostoller |
| 2006/0141109 A1 | 6/2006 | Roth |
| 2006/0251774 A1 | 11/2006 | Osborn |
| 2007/0141974 A1 | 6/2007 | McNaughton et al. |
| 2007/0254573 A1 | 11/2007 | Horst et al. |
| 2008/0213444 A1 | 9/2008 | Mixon et al. |

FOREIGN PATENT DOCUMENTS

| | | |
|---|---|---|
| JP | 6439965 | 2/1989 |
| JP | 2163034 A | 6/1990 |
| JP | 03004737 A | 1/1991 |
| SU | 528923 | 12/1976 |

* cited by examiner

US 7,963,828 B2

METHOD AND APPARATUS FOR PREPARING POULTRY CARCASSES FOR DEFEATHERING OPERATIONS

TECHNICAL FIELD OF THE INVENTION

The present invention is directed to poultry processing, and, more particularly, to methods and apparatus for preparing poultry carcasses for defeathering without having to subject the carcasses to high temperatures.

BACKGROUND OF THE INVENTION

Poultry processing typically involves passing the birds through various equipment stations to stun, kill, and then bleed the birds. The still feathered poultry carcasses are then placed in a hot water bath or subjected to steam to heat the skin of the carcass in order to loosen the feathers. This heating process is commonly referred to as "scalding." Once the feathers are loosened by the scalding step, poultry carcasses pass through defeathering equipment, and then the defeathered carcasses are eviscerated. The eviscerated carcasses are then typically chilled and packaged or passed on to further processing operations.

Although rinsing or washing steps may be performed prior to or during defeathering, and thereafter, bacterial contamination remains a serious problem in poultry processing. There may be a significant bacterial load along with all manner of filth on a bird's feathers at the start of processing. Fecal matter may be released from a bird's lower intestines in the scalding process or during defeathering. The fecal matter may contaminate the carcass or processing equipment, and may result in cross contamination with other carcasses. Particularly challenging are immersion-type scald tanks in which carcasses are immersed in a scald water held at a temperature typically between 120° F. and 140° F. The scald water in these tanks quickly becomes loaded with bacteria and filth which may find its way to the skin of the carcasses passing through the tank. Once on the skin of the carcass, the defeathering equipment may rub or massage the bacteria and filth in to the skin of the carcass, and particularly the openings left after feathers are pulled from the carcass. Once the bacteria is thus massaged into the skin of the carcass, it becomes more difficult to remove or kill.

Beyond the bacterial contamination problem associated with defeathering operations, the heat to which the carcasses are subjected preparatory to defeathering results in other problems. First, the heat applied during scalding may lower the quality of the skin on the carcass. Second, the heat applied during scalding increases the time and cost associated with later chilling operations. Additionally, there is the cost of heating the scald water, a cost made higher by having to constantly circulate in cleaned water in an effort to address bacterial loading in the scald water.

There remains a need for methods and apparatus that will reduce or eliminate the above problems and others associated with scalding and defeathering operations in poultry processing.

SUMMARY OF THE INVENTION

The present invention provides a method that overcomes the above-described problems and others associated with poultry carcass processing, especially those steps in poultry processing associated with defeathering the carcasses. In particular, the present invention provides a method of applying an ammonia-based treatment material to a feathered poultry carcass to prepare the carcass for defeathering. The prepared poultry carcass may be defeathered using a conventional defeathering apparatus either without having to apply heat to the carcass via a scalding process, or at least with a reduced level of heat applied to the carcass. The invention also encompasses an apparatus for defeathering poultry carcasses.

One preferred method within the scope of the present invention for treating a feathered poultry carcass includes first placing the poultry carcass in contact with an ammonia-based treatment material to modify the pH at the skin of the poultry carcass, that is, at the surface of the carcass skin. Although even minimal increases in the pH at the skin of the poultry carcasses provides benefits, it is believed that the contact with the pH increasing material should raise the pH at the skin of the poultry carcass at least one-half (0.5) point on the pH scale over the initial pH. Regardless of the pH increase effected by the contact with the pH increasing material, the method also includes removing ammonia from the poultry carcass after placing the poultry carcass in contact with the ammonia-based treatment material.

The increased pH at the skin of the feathered poultry carcass occasioned by the contact with the ammonia-based treatment material causes components associated feather follicles in the carcass skin to soften and/or become gelatinous. This softening and/or change in character of the components allows standard defeathering equipment to remove the feathers. Thus feather removal may be accomplished without having to apply heat to the poultry carcass, or at least reduces the amount of heat that may be needed to facilitate defeathering. Thus even where heat is still applied to the poultry carcass prior to defeathering, the amount of heat that may be applied is sufficiently low to minimize any adverse affects on the carcass skin.

The application of the ammonia-based treatment material has another beneficial effect in the poultry carcass in addition to helping facilitate defeathering. Specifically, the absorbed ammonia helps kill bacteria that may be present at or just below the surface of the carcass skin. The contact between the defeathering equipment and the poultry carcass actually helps massage the ammonia-based treatment material into the skin and structures in the skin such as pores and follicles, and thus helps to distribute the treatment material at the carcass skin. This distribution resulting from the contact associated with defeathering helps reach areas where contaminating bacteria may reside within the skin of the poultry carcass, and thereby enhances the antibacterial effect of the ammonia-based treatment material.

A preferred ammonia-based treatment material for use in the present invention comprises liquid ammonia either at atmospheric pressure or at a higher pressure to allow the ammonia to stay in a liquid phase at higher temperatures. An ammonia-based treatment material may alternatively comprise an ammonium-hydroxide solution. A gas including ammonia gas may also be used as an ammonia-based treatment material within the scope of the present invention. Various contacting arrangements for liquid ammonia, gaseous ammonia, and ammonium hydroxide solution will be described below in connection with the illustrative embodiments.

The invention encompasses many alternative steps and combinations of steps for removing ammonia from the poultry carcass. The removed ammonia may be from excess ammonia-based treatment material that has been applied to the feathered poultry carcass but has not been absorbed into the skin of the carcass. Ammonia removed from the poultry carcass may also be ammonia which is released from the poultry carcass after the ammonia-based treatment material has been absorbed into some part of the poultry carcass. Preferred ammonia removal steps include rinsing the poultry carcass with water, immersing the poultry carcass in water, and placing the poultry carcass under pressure and/or temperature conditions to facilitate the release of ammonia gas. Further details of these ammonia removal steps will be described below in connection with the illustrative embodiments of the invention.

Ammonia may be removed from the poultry carcass before or after initiating defeathering on the carcass. Removal of ammonia will necessarily also be performed during the defeathering operation on the carcass. Variations in the sequence of the defeathering operations and removal of ammonia from the poultry carcass will be described further below in connection with the example treatment systems shown in the drawings.

These and other advantages and features of the invention will be apparent from the following description of the preferred embodiments, considered along with the accompanying drawings.

DESCRIPTION OF ILLUSTRATIVE EMBODIMENTS

In the following description of illustrative embodiments, a preferred process according to the present invention and certain variations in that preferred process will be described with reference to the flow diagram of FIG. 1. Three preferred systems for performing processes according to the invention will be described in connection with FIGS. 2, 5, and 6. Specific treatment material application techniques and ammonia removal techniques will be described in connection with the devices shown in FIGS. 3 and 4.

Figure 1:
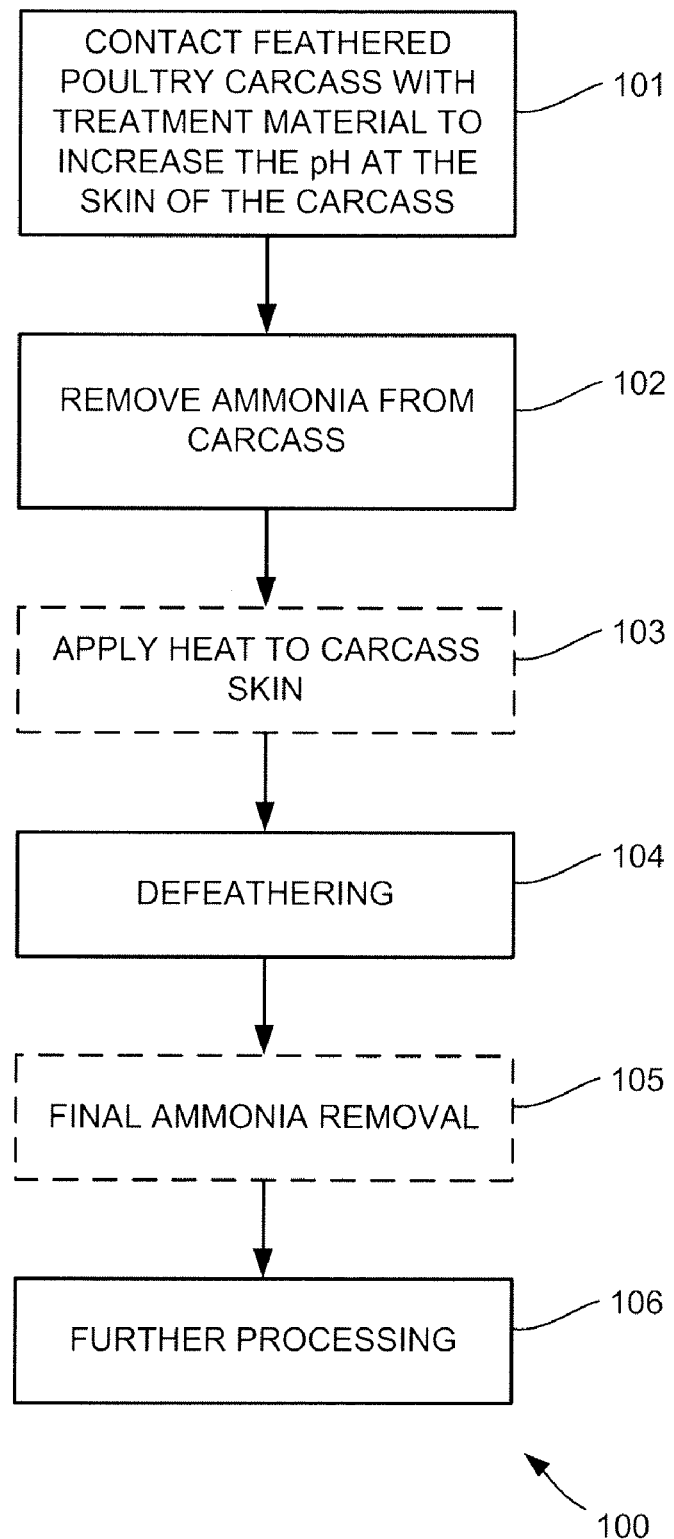
FIG. 1 is a flow diagram showing process steps performed according to one embodiment of the present invention.

Referring now to FIG. 1, a process 100 according to the present invention includes contacting a feathered poultry carcass with an ammonia-based treatment material as shown at process block 101. This contact with the ammonia-based treatment material preferably increases the pH at the skin of the carcass at least one-half (0.5) point on the pH scale. After the contact with the ammonia-based treatment material at process block 101, the method includes removing ammonia from the carcass as shown at process block 102. These first two steps shown in FIG. 1 at process blocks 101 and 102 comprise the basic arrangement of the present invention for preparing the poultry carcass for defeathering. Thus, the method may proceed directly from process block 102 to the defeathering operation shown at process block 104. After the defeathering operation, the now defeathered poultry carcass may proceed on to additional processing such as evisceration and then packaging or further processing to cut the eviscerated poultry carcass into pieces. Because these additional processing steps do not form a part of the present invention, FIG. 1 simply shows all further processing steps grouped together as single process block 106.

FIG. 1 also shows that heat may be applied to the skin of the carcass at process block 103, prior to defeathering. This heat application may not be required in some forms of invention and is thus shown as a dashed box. FIG. 1 also shows an additional ammonia removal step at process block 105, after defeathering and prior to further processing. This additional ammonia removal step may not be performed in some circumstances and is thus also shown as a dashed box.

The treatment material applied as shown at process block 101 may be any one of several different ammonia-based treatment materials, or a combination of two or more of these materials. One form of the invention employs liquid ammonia which, when applied at atmospheric pressure, must be at a temperature of approximately −27° F. or below. If applied at higher than atmospheric pressure, the liquid ammonia may be at a higher temperature, but is preferably at a temperature below the freezing point of the poultry carcass being processed. It should be noted that where the ammonia-based treatment material includes liquid ammonia, other materials may be included with the ammonia such as small amounts of water. A liquid ammonia treatment material significantly below the freezing temperature of the poultry carcass has the benefit of quickly producing the desired pH increase at the skin of the poultry carcass and then freezing the skin of the poultry carcass to prevent the ammonia from penetrating too deeply into the poultry carcass and producing adverse effects by such penetration.

Alternative processes according to the present invention may use ammonium hydroxide solutions or gaseous ammonia to increase the pH at the skin of the poultry carcass in preparation for defeathering. Although fairly dilute ammonium hydroxide solutions may be used within the scope of the invention, more preferred ammonium hydroxide solutions may have a very high ammonia content, for example, a solution made up of 50% liquid ammonia and 50% water by volume. In order to maintain the ammonia in solution at high concentrations, that is, to limit ammonia evaporation from the solution, the solution typically must be held at a low temperature. For example, a temperature of −45° F. or below at the time the solution is applied to the poultry carcass is appropriate for a solution of 50% liquid ammonia and 50% water by volume. However, an ammonium hydroxide solution may be applied at much higher temperatures within the scope of the present invention, 70° F. for example.

Where gaseous ammonia is used as the ammonia-based treatment material, the ammonia gas may be substantially pure or may be mixed with other gases such as air, nitrogen, or any other suitable gas. In order to facilitate the absorption of the ammonia gas into the skin of the poultry carcass to produce the desired pH increase, gaseous ammonia is preferably applied at a temperature below the temperature of the feathered poultry carcass. This may be a temperature of around 110° F. or below. However, ammonia gas may be applied at any temperature that will allow sufficient ammonia absorption at the carcass skin to produce the desired pH increase at the surface of the carcass skin. Also, the pressure at which the ammonia gas may be applied to the poultry carcass may vary from relatively high pressures to atmospheric pressure. Higher ammonia gas application pressures may be used to produce the desired pH increase at the skin of the carcass in a relatively short time, on the order of a few seconds. A given pH increase at the skin of the carcass would be expected to take a longer time where the ammonia gas is applied at a pressure near atmospheric pressure.

It should be noted that the desired pH increase at the surface of the carcass skin will inevitably produce at least some increase in pH below the surface of the skin, that is, in portions of the skin below the outer surface of the skin. However, the pH increase that is required according to the present invention is just at the outer surface of the carcass skin where the structures which hold the feathers in place are located. It is in this area of the carcass skin that the pH increase occasioned by the ammonia-based treatment material produces the desired softening of materials that facilitate feather removal. Also, although the pH increase may be produced across the entire surface area of the carcass skin, some embodiments may limit the pH increase to less the entire skin surface area.

The pH at the skin surface may be measured in any suitable fashion. For example, a pH meter may be used to determine whether the pH has been increased at the surface of the carcass skin to the desired extent, at least 0.5 (one-half) point on the pH scale.

Because the primary purpose of applying the ammonia-based treatment material to the carcass is to soften the skin components associated with the feathers to facilitate feather removal, there must be a sufficient delay between the treatment material application and defeathering to allow the softening effect to occur. However, the softening effect occurs very rapidly after ammonia-based treatment material application and thus the delay required between application and feather removal is minimal. The time delay between ammonia-based treatment material application and defeathering need only be a few seconds where the pH increase is 0.5 or more on the pH scale. As a practical matter, the necessary delay will occur in the course of transporting the carcasses from the treatment material application device to the defeathering device described below in connection with FIGS. 2, 5, and 6.

Although the step of removing ammonia from the poultry carcass is shown as a separate step at process block 102 and as an alternate step at process block 105 in FIG. 1, the ammonia removal steps need not be separate steps and need not be in the relative order shown in FIG. 1. In some preferred forms of the invention, and as will be apparent from the description of the processing systems described below in connection with FIGS. 2, 5, and 6, any or all of the processing steps after the contact shown at process block 101, may include ammonia removal and recovery. For example, where heat is applied to the poultry carcass prior to defeathering, the heating process may have the effect of causing ammonia to be released from the carcass. This ammonia released from the carcass during heating is preferably recovered and recycled in the treatment system. The defeathering process also causes ammonia to be removed from the poultry carcass at least to the extent the feathers are removed in the defeathering process and the feathers themselves have previously absorbed ammonia in the treatment material contacting step. Additional ammonia may be removed from the skin of the carcass during the defeathering operation, and this ammonia may be recovered and reused as well. Furthermore, although not shown in FIG. 1, the feathers removed at process block 104 may have absorbed significant amounts of ammonia and may be processed separately to recover the absorbed ammonia. Even one or more of the further processing steps indicated generally at process block 106 may include an ammonia removal and recovery step.

Regardless of whether the ammonia removal step is performed as a separate step or is performed in combination with another step shown in FIG. 1, ammonia removal may include active steps such as spraying water onto the carcass or immersing the carcass in water. In these cases, ammonia is mostly removed by being taken up in solution in the water coming in contact with the carcass. Alternatively to steps which apply a rinse liquid such as water to the poultry carcass in some fashion, the carcass may simply be held under conditions to encourage ammonia to release from the carcass. For example, the carcass may be placed under a vacuum and/or may be heated to encourage ammonia to release from the carcass in gaseous form. It should be noted again that the ammonia which may be removed from the carcass may be ammonia that is held in solution or in liquid form and has not been absorbed into any portion of the poultry carcass. The removed ammonia may also be ammonia that has been absorbed in some fashion into the poultry carcass, and then released, such as for example, coming out of solution in moisture associated with the carcass skin.

The desirability of applying heat to the carcass skin prior to defeathering, as shown at optional process block 103 in FIG. 1, may depend upon the type of ammonia-based treatment material applied to the carcass at process block 101. Where the ammonia-based treatment material comprises liquid ammonia or an ammonium hydroxide solution (particularly a strong ammonium hydroxide solution such as a 50% ammonia solution), preferably little or no heat is applied to the carcass skin. In this preferred method using liquid ammonia or an ammonium hydroxide solution as the treatment material, the temperature of the treatment material will not exceed the temperature of the carcass at the time of slaughter, between 105° F. and 110° F. Where the ammonia-based treatment material applied at process block 101 comprises ammonia gas, it may be desirable to heat the carcass skin (for example, between approximately 30 to 35 degrees Fahrenheit) through the ammonia gas application in order to reduce or eliminate the use of a water bath-type scald step or other scald step prior to defeathering.

Figure 2:
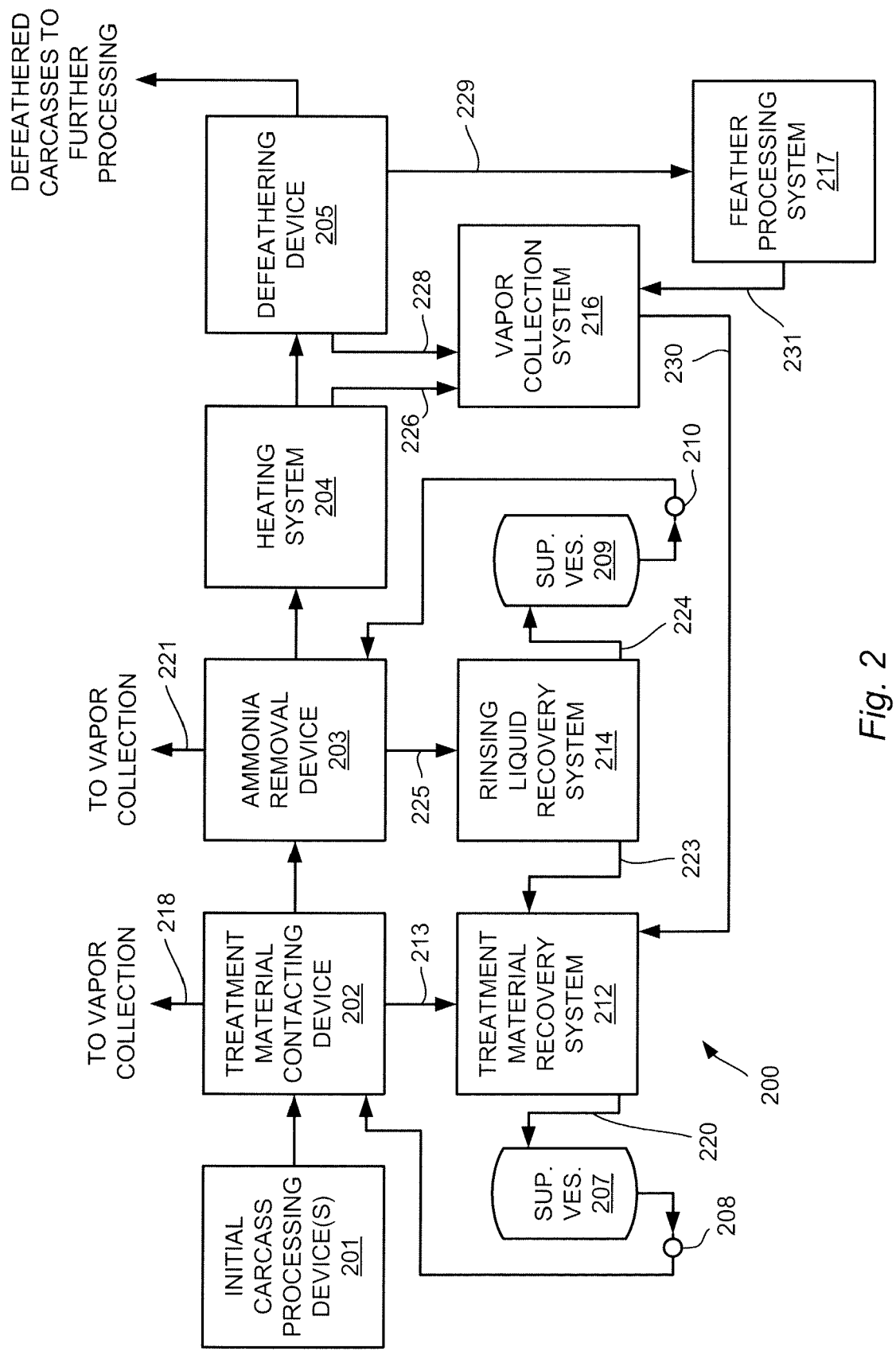
FIG. 2 is a diagrammatic representation of one preferred processing system for preparing poultry carcasses for defeathering and for performing defeathering on the prepared poultry carcasses.

FIG. 2 shows an example of an apparatus 200 for preparing poultry carcasses (not shown) for defeathering and for performing the defeathering operation. Apparatus 200 receives poultry carcasses from one or more initial carcass processing devices 201, and includes a treatment material contacting device 202, an ammonia removal device 203, a heating system 204, and a defeathering device 205. A number of additional components are included in apparatus 200 for supporting the functions performed by treatment material contacting device 202 and ammonia removal device 203. These supporting devices include a treatment material supply vessel 207 and supply pump 208 associated with treatment material contacting device 202. A rinsing liquid supply vessel 209 together with a rinsing liquid pump 210 is associated with ammonia removal device 203. Apparatus 200 further includes an ammonia recovery system 212, a rinsing liquid recovery system 214, a vapor collection system 216, and a feather processing system 217.

The initial carcass processing devices indicated diagrammatically at 201 are responsible for stunning and killing the birds and then removing blood from the carcasses. Although shown as a single component, it will be appreciated that one or more separate devices may be used to provide these initial processing steps. Also, some of the steps may be performed manually. Regardless of the device or devices use in initial processing, the end result is a feathered poultry carcass that preferably has substantially no free moisture on the skin or in the feathers, and has preferably been bled and is ready for further processing according to the present invention.

Treatment material contacting device 202 includes a suitable apparatus for placing the feathered poultry carcasses received from initial processing devices 201 in contact with an ammonia-based treatment material. The specific structure of treatment material contacting device 202 will depend upon the nature of the ammonia-based treatment material being used in apparatus 200. For example, where the treatment material includes liquid ammonia or an ammonium hydroxide solution, treatment material contacting device 202 may include either an arrangement for spraying the liquid treatment material on the poultry carcasses or an arrangement for immersing the poultry carcasses in the liquid treatment material. Further details of a spray-type treatment material contacting device will be described below in connection with FIG. 3, while further details of an immersion-type treatment material contacting device will be described below in connection with FIG. 4. Because the arrangement of devices shown in FIG. 2 is particularly suited for the case in which the ammonia-based treatment material includes liquid ammonia or an ammonium hydroxide solution, the following discussion of FIG. 2 will omit any discussion of applying gaseous ammonia as the treatment material. An embodiment employing gaseous ammonia as the treatment material will be described below in connection with the alternative apparatus 500 shown in FIG. 5.

Referring back to FIG. 2, regardless of whether treatment material contacting device 202 contacts the feathered poultry carcasses by spraying the ammonia-based material or by immersion in the treatment material, significant amounts of ammonia gas may be released during application of the liquid material to the feathered poultry carcasses in device 202. Therefore treatment material contacting device 202 preferably includes a suitable chamber in which escaping the ammonia gas may be collected and returned through vapor collection line 218 to vapor collection system 216.

Treatment material supply vessel 207 may comprise any suitable vessel for holding a supply of the desired ammonia-based treatment material. For example, where the treatment material includes liquid ammonia, supply vessel 207 will include a suitable vessel for holding low-temperature liquids such as liquid ammonia. A suitable supply vessel for liquid ammonia will include thermal insulation and may also include a system for actively maintaining the temperature of the liquid ammonia. A supply vessel 207 suitable for containing an ammonium hydroxide solution treatment material, also preferably includes thermal insulation and is associated with a chiller for maintaining the ammonium hydroxide in a temperature range preferably between approximately −60° F. and −40° F., in order to help hold the ammonia in solution. Pump 208 is used in apparatus 200 to supply the liquid treatment material (either liquid ammonia or an ammonium hydroxide solution) to treatment material contacting device 202 at the desired pressure and flow rate. This desired pressure and flow rate may be that necessary for operating spray nozzles where device 202 applies the treatment material via a spray, or may simply be a pressure and flow rate suitable for circulating the liquid treatment material to an immersion vessel within device 202 where the device applies the treatment material by immersion.

Treatment material recovery system 212 shown in FIG. 2 is included in apparatus 200 for recovering and reconditioning treatment material that is applied to the poultry carcasses within treatment material contacting device 202. Where the treatment material comprises an ammonium hydroxide solution or liquid ammonia which is sprayed or otherwise applied to poultry carcasses within treatment material contacting device 202, a drain pan or other suitable liquid collecting structure (not shown in FIG. 2) is preferably located at the bottom of the device for collecting any of the liquid treatment material that does not remain on the poultry carcasses. Liquid treatment material collected in this drain pan may be returned continuously or periodically to treatment material recovery system 212 through a suitable return conduit 213. Treatment material recovery system 212 may include filters, separators, and/or other components necessary for removing contaminants from the collected liquid treatment material. In the case of an ammonium hydroxide treatment material, treatment material recovery system 212 may include a supply of ammonia (not shown separately in FIG. 2) and a supply of make up water for adding to the recovered ammonium hydroxide solution to produce the desired strength of solution for storage in supply vessel 207. After any necessary processing in system 212, treatment material may be directed to supply vessel 207 through line 220.

It will be appreciated that whether the treatment material is liquid ammonia or an ammonium hydroxide solution, not all ammonia applied to poultry carcasses in contacting device 202 will be recovered in treatment material recovery system 212 and in the other ammonia recovery devices described further below. Thus supply vessel 207 must have some capability of receiving additional treatment material.

Ammonia removal device 203 may comprise any suitable arrangement for removing ammonia from the poultry carcasses received from treatment material contacting device 202. One preferred ammonia removal device comprises a device for spraying a rinsing liquid such as water onto the poultry carcasses arriving from treatment material contacting device 202. A suitable rinsing liquid spraying device will be described below with reference to FIG. 3. Another preferred ammonia removal device comprises a device for immersing the poultry carcasses in a rinsing liquid. An immersion-type rinsing device will be described below in connection with FIG. 4. Whether applied as a spray or applied via immersion, the rinsing liquid serves to dilute any free ammonium hydroxide solution which may be left on the poultry carcasses, and serves to absorb free ammonia gas around the poultry carcasses.

Supply vessel 209 may comprise simply a vessel of sufficient capacity to properly supply a rinsing liquid to ammonia removal device 203. Any pump capable of providing the desired pressure and flow rate required for ammonia removal device 203, may be employed as pump 210. The flow rate and pressure necessary will depend upon whether device 203 is a spray-type or immersion-type device, and will also depend upon the number of poultry carcasses being processed and the rate at which they are processed through device 203.

Rinsing liquid recovery system 214 is included in apparatus 200 for receiving used rinsing liquid from ammonia removal device 203 through return line 225, recovering ammonia picked up by the rinsing liquid, and also recovering the rinsing liquid itself for recycling in the system. Rinsing liquid recovery system 214 may include filters, separators, or other devices for performing these functions. Ammonia or ammonium hydroxide solution is transferred from rinsing liquid recovery system 214 to treatment material recovery system 212, and water is returned to supply vessel 209 through water return line 224. The manner in which used rinsing liquid is received from ammonia removal device 203 will depend upon the type of rinsing performed in ammonia removal device. In the case of a rinsing liquid spray-type device, the rinsing liquid and ammonia it has absorbed or otherwise removed from the poultry carcasses in device 203 may collect in a suitable drain pan in device 203. The collected rinsing liquid may be transferred continuously or periodically through return line 225 to rinsing liquid recovery system 214. Where an immersion-type rinsing device is employed as ammonia removal device 203 in FIG. 2, the immersion liquid is preferably continuously removed from the immersion vessel and directed to rinsing liquid recovery system 214 through line 225 in order to remove ammonia that has gone into solution in the immersion liquid and in order to remove materials that would otherwise collect in the immersion liquid in device 203. In particular, the ammonia concentration in the rinse water of an immersion-type rinsing device must be maintained low enough to avoid an excessive pH increase in the poultry carcasses which might adversely affect the quality of products produced from the carcasses.

Alternatively to using a rinsing or immersion liquid to remove ammonia from the poultry carcasses, device 203 may simply hold the carcasses under conditions which allow ammonia to release from the poultry carcasses in the form of a gas. These conditions may include a low pressure (either at or below atmospheric pressure) and/or an elevated temperature. This alternative process for removing ammonia in device 203 does not require a rinsing liquid. Thus where temperature and pressure are used by themselves in device 203, without any rinsing liquid, supply vessel 209 and rinsing liquid recovery system 214 may be omitted from the system. In this case, all of the ammonia removed through ammonia removal device 203 will be drawn off through line 221 in FIG. 2 and processed through vapor collection system 216.

Heating system 204 may be included in apparatus 200 in order to apply heat to the poultry carcasses to further loosen the feathers in preparation for defeathering device 205. Heat may be applied in the form of steam, via electromagnetic radiation, or by applying a warm liquid to the poultry carcasses via a spray or by immersion a warm liquid bath. This heating is akin to the scalding performed in the prior art preparatory for defeathering. However, significantly less heat may be required in view of the application of the ammonia-based treatment material according to the present invention. Although higher temperatures may be used without departing from the scope of the present invention, it is expected that the temperature of the carcass skin need not exceed approximately 110° F. for defeathering. Sufficient heat may be applied in heating system 204 to cause ammonia gas to be released from the poultry carcasses within the heating system. Therefore, heating system 204 is preferably housed in a suitable chamber for collecting any released ammonia gas. Any such gas may be drawn off through line 226 to vapor collection system 216.

It is also possible that the ammonia-based treatment material applied in contacting device 202 may loosen the feathers on the poultry carcasses sufficiently that no heating of the carcasses is required. In this latter case, heating system 204 may be completely eliminated form apparatus 200. Alternatively, the slight heat that may be applied in ammonia removal device 203 as described above, together with the loosening effect produced by the ammonia-based treatment material, may loosen the feathers sufficiently to facilitate feather removal in defeathering device 205.

Defeathering device 205 may use any suitable defeathering mechanism. Examples of defeathering mechanisms that may be used in device 205 are shown in U.S. Pat. No. 4,217,678 to Crawford et al., U.S. Pat. No. 6,168,510 to Ford, and U.S. Pat. No. 5,853,320 to Wathe et al. The entire content of each of these patents is incorporated herein by this reference. As shown in these patents, numerous variations exist in defeathering mechanisms. As a general proposition, however, defeathering mechanisms typically rely on feather contacting elements that are driven over the surface of the feathered poultry carcass. Contact between the contacting elements and the feathers remaining on the carcass provides sufficient pulling force to pull the feathers from the carcass, provided the feathers have been loosened from their natural state as has been described above. Although any suitable defeathering mechanism may be used in defeathering device 205, the device does include certain elements unique to the present invention. For example, defeathering device 205 includes a suitable housing or chamber for containing the defeathering mechanism. This chamber is used to collect ammonia gas that may be released from the poultry carcasses in the course of defeathering. An ammonia collection line 228 runs from a vent or opening in the chamber of device 205 to vapor collection system 216.

Another modification of defeathering device 205 which distinguishes it from prior art defeathering devices is that the feathers removed in the device are preferably transferred to feather processing system 217 to recover additional ammonia that may remain in liquid held by the feathers even after previous ammonia removal steps applied in apparatus 200. In one preferred arrangement, feathers collecting within the chamber of defeathering device 205 are removed by an auger (not shown) at the bottom of the chamber and transferred through conduit 229 to feather processing system 217. Feather processing system 217 preferably comprises a mixing device in which the collected feathers may be agitated while mild heat is applied to the feathers to drive off ammonia remaining in the feathers. The recovered ammonia gas may be filtered through a suitable filter associated with feather processing system and then directed through conduit 231 to vapor collection system 216 as shown in FIG. 2. The ability to recover ammonia from the feathers of the poultry carcasses is helpful regardless of the particular ammonia-based treatment material applied to the poultry carcasses. However, recovering ammonia from the carcass feathers is particularly important when the treatment material comprises an ammonium hydroxide solution because the feathers may tend to pick up relatively large quantities of the solution.

Vapor collection system 216 provides a path through which recovered ammonia gas may be processed in apparatus 200. In one preferred form of the invention, vapor collection system 216 includes a suitable device for applying a slight vacuum to the respective chamber of treatment material contacting device 202, ammonia removal device 203, heating system 204, and defeathering device 205. Vapor collection system 216 may also include suitable devices for separating out the ammonia gas from other gases that may be collected from devices 202, 203, 204, and 205. In one preferred form of the invention, the ammonia gas separator employed in vapor collection system 216 comprises a bath of liquid ammonia through which the collected vapor may be passed. The ammonia in the vapor condenses in the liquid ammonia bath and the remaining gas, comprising mostly air, may then be released to the atmosphere or to an additional scrubbing device before release to the atmosphere. In any event, vapor collection system 216 ultimately directs the collected ammonia to treatment material recovery system 212 through return line 230.

It will be appreciated that FIG. 2 shows all of the connecting lines diagrammatically and thus omits various fittings and flow controls that would be included in the apparatus. Also, apparatus 200 only diagrammatically indicates that the poultry carcasses processed in the apparatus are transferred from initial processing devices 201, then to treatment material contacting device 202, ammonia removal device 203, heating system 204, and defeathering device 205, and that the defeathered carcasses are ultimately transferred on for further processing. Apparatus 200 may include one or more types of conveying devices that convey the carcasses from one device to another and also convey the carcasses through the individual devices. For example, apparatus 200 may include an overhead conveying system from which the poultry carcasses are suspended and transported from device to device and also through the individual devices. Details regarding the conveying devices that may be used in apparatus 200, and regarding the various connecting lines for transferring materials to and from the various devices in the system are all well known in the art and are thus eliminated from FIG. 2 in order to avoid obscuring the invention in unnecessary detail. Also, although preferred forms of apparatus 200 are fully automated, some steps performed in apparatus 200 may be performed manually. In particular, carcasses may be hung manually on an overhead conveying device and may be manually removed from the overhead conveying device as well.

In the operation of apparatus 200, feathered poultry carcasses (not shown) that have preferably been bled but otherwise remain intact are supplied by initial carcass processing devices 201 to treatment material contacting device 202. As the poultry carcasses are preferably conveyed through treatment material contacting device 202 with a suitable conveying system, liquid ammonia or an ammonium hydroxide solution is applied to the poultry carcasses to increase the pH at the skin of the carcasses. This application of ammonia-based treatment material corresponds to process block 101 shown in the flow diagram of FIG. 1. Ammonia is then removed from the carcasses at ammonia removal device 203, and mild heat is applied to the still feathered carcasses at heating system 204. The ammonia removal and heating correspond to blocks 102 and 103, respectively, in FIG. 1. Ultimately, the carcasses which have had their feathers loosened by the application of the ammonia-based treatment material and mild heat are conveyed to defeathering device 205 which removes the feathers from the poultry carcasses in a step corresponding to process block 104 in FIG. 1. The now defeathered poultry carcasses are then conveyed on for any further processing that may be desired to produce the final processed poultry product.

Figure 3:
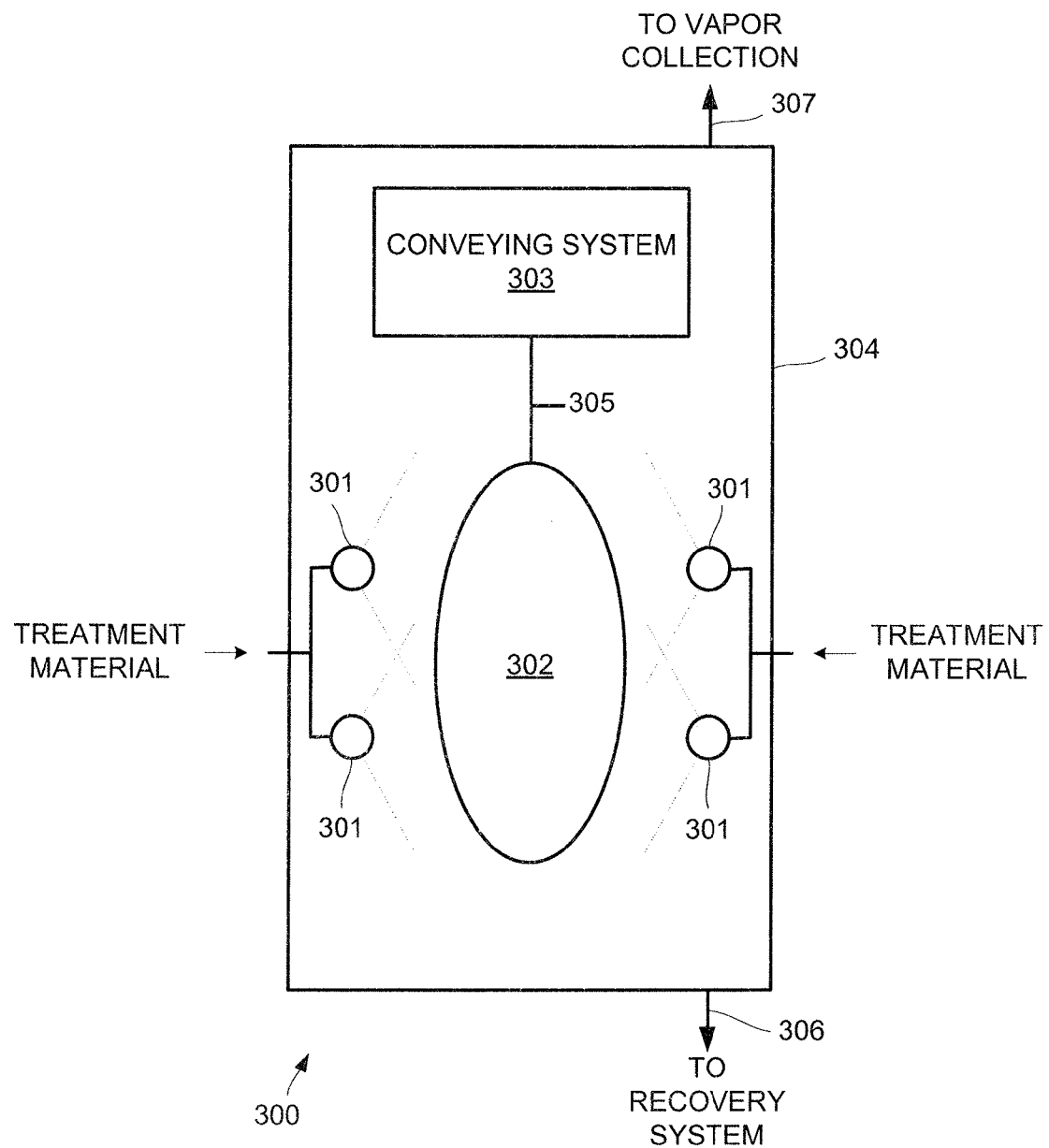
FIG. 3 is a diagrammatic representation of a spray-type treatment material or rinsing material application device which may be used in the present invention.

FIG. 3 provides a diagrammatic representation of a spray device 300 that may be used as treatment material contacting device 202 in FIG. 2 to spray a liquid ammonia-based treatment material (either ammonium hydroxide solution or liquid ammonia) onto a poultry carcass. Spray device 300 may also be used as ammonia removal device 203 in FIG. 2 to spray a rinsing liquid onto the poultry carcasses passing through the device. Spray device 300 includes a number of spray nozzles 301 positioned around a position of a poultry carcass 302 within the device. Although four spray nozzles 301 are shown in FIG. 3 for purposes of example, it will be appreciated that more or fewer spray nozzles 301 may be used to provide the desired contact with the treatment material or rinse liquid across the entire surface of the poultry carcass 302. Also, spray nozzles 301 may be stationary within device 300, or may be manipulated relative to the poultry carcass 302 to provide the desired spray coverage on the carcass.

Spray nozzles 301 together with conveying system 303 are contained within a chamber 304 which provides an area in which spray from the nozzles is contained along with ammonia gas that may escape from the spray or from the carcass 302 after contact with the treatment material or rinse liquid. Conveying system 303 is illustrated diagrammatically as an overhead-type conveying system in which the poultry carcass 302 is suspended on a suitable support 305 as the carcass is conveyed through chamber 304. An overhead-type conveying system is well suited for use in spraying device 300 because it holds the carcass 302 in a good position for applying the treatment material. However, belt-type conveying systems which support the poultry carcass 302 on a mesh belt may also be used in spraying device 300 in lieu of an overhead-type conveyer.

The bottom of chamber 304 forms a drain pan for collecting excess spray liquid. This excess spray liquid that may collect in the bottom of chamber 304 may be removed through line 306. Line 306 corresponds to line 213 in FIG. 2 when spray device 300 is used as treatment material contacting device 202 in FIG. 2, and corresponds to line 225 in FIG. 2 when the spray device is used as ammonia removal device 203 in FIG. 2. Ammonia gas that may escape from the poultry carcass 302 or from the spray liquid and collect in chamber 304 may be drawn off through line 307. This line 307 corresponds to line 218 in FIG. 2 when spray device 300 is used as treatment material contacting device 202 in FIG. 2, and corresponds to line 221 in FIG. 2 when the spray device is used as ammonia removal device 203 in FIG. 2.

Figure 4:
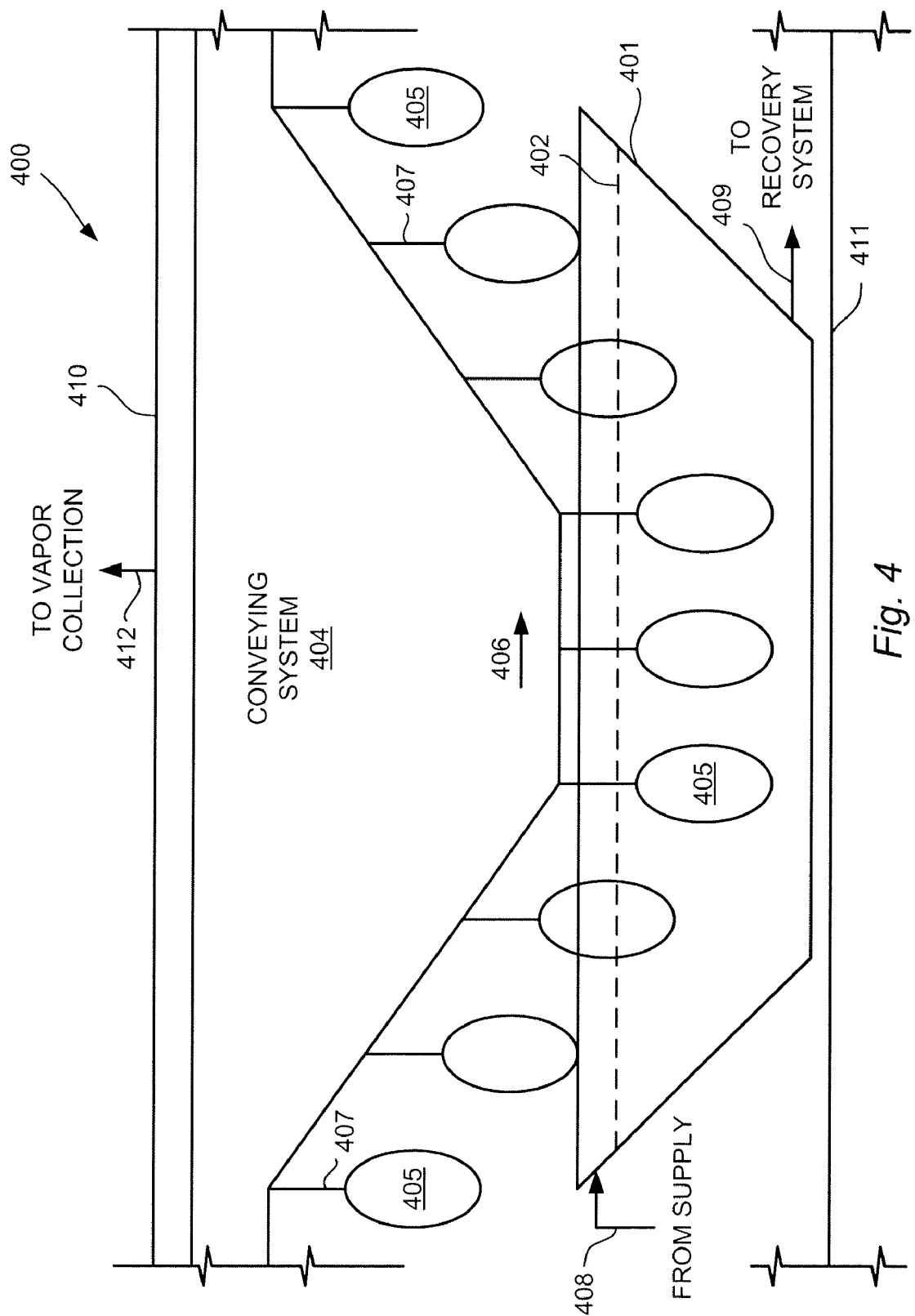
FIG. 4 is a diagrammatic representation of an immersion-type treatment material or rinsing material application device which may be used in the present invention.

FIG. 4 shows a diagrammatic representation of an immersion system 400 that may be used both for treatment material contacting device 202 and for ammonia removal device 203 in the apparatus shown in FIG. 2. Immersion system 400 includes an immersion vessel 401 which contains the desired liquid material. The level of the liquid material in immersion vessel 401 is shown at dashed line 402. Where immersion system 400 is employed as treatment material contacting device 202 in FIG. 2, the liquid in vessel 401 will comprise either liquid ammonia or an ammonium hydroxide solution. However, when used as ammonia removal device 203 in FIG. 2, the liquid in vessel 401 preferably comprises water. Immersion system 400 also includes a conveying system 404 for conveying the poultry carcasses 405 through the device in the direction indicated by arrow 406. In particular, conveying system 404 suspends each poultry carcass 405 on a suitable support 407, and carries each suspended carcass along a flight which first lowers the respective carcass into the immersion liquid in vessel 401 for a desired period of time, and then withdraws the respective poultry carcass from the liquid.

FIG. 4 shows an inlet 408 to immersion vessel 401 as well as an outlet 409. Inlet 408 and outlet 409 are used, respectively, to circulate fresh treatment liquid into vessel 401 and to remove treatment liquid that may have been degraded in the course of operation of system 400. For example, where immersion system 400 is used as treatment material contacting device 202 in FIG. 2, particulates and various contaminants may fall into the treatment liquid in vessel 401 over time, and these materials may be circulated out of the vessel through outlet 409. The liquid exiting through outlet 409 may be filtered or otherwise processed to remove contaminants using a device such as treatment material recovery system 212 in FIG. 2. It should be noted that where immersion system 400 is used as treatment material contacting device 202 in FIG. 2, outlet 409 would be connected to line 213 to treatment material recovery system 212 in FIG. 2, and inlet line 408 would be connected to the line from supply vessel 207. Where immersion system 400 is used as ammonia removal device 203 in FIG. 2, outlet line 409 would be connected to line 225 to rinsing liquid recovery system 214 in FIG. 2 and inlet line 408 would be connected to the line from supply vessel 209. In the operation of immersion system 400 in this configuration, liquid in vessel 401 comprises water and this water will pick up ammonia from the poultry carcasses 405 passing through the vessel, thereby forming an ammonium hydroxide solution. The ammonium hydroxide solution may be removed through outlet 409 for recovery of the ammonia and rinse water. Meanwhile fresh (ammonia-free) rinse water is introduced into vessel 401 through inlet 408 to maintain the desired liquid level and reduce the ammonium hydroxide concentration of the remaining rinse water.

Immersion system 400 preferably includes a chamber for enclosing immersion vessel 401 and conveying system 404. the top of the chamber is indicated at 410 in FIG. 4, while the bottom of the chamber is indicated at 411. The chamber provides a collection area in which ammonia vapor escaping from the liquid in vessel 401 and from the poultry carcasses 405. A vapor outlet or vent 412 is included in the chamber for allowing the collected vapor to be removed continuously or periodically. Vapor outlet corresponds to line 218 in FIG. 2 when the immersion system 400 is employed as treatment material contacting device 202 in that figure, and corresponds to line 221 when the immersion system is employed as ammonia removal device 203 in FIG. 2.

Figure 5:
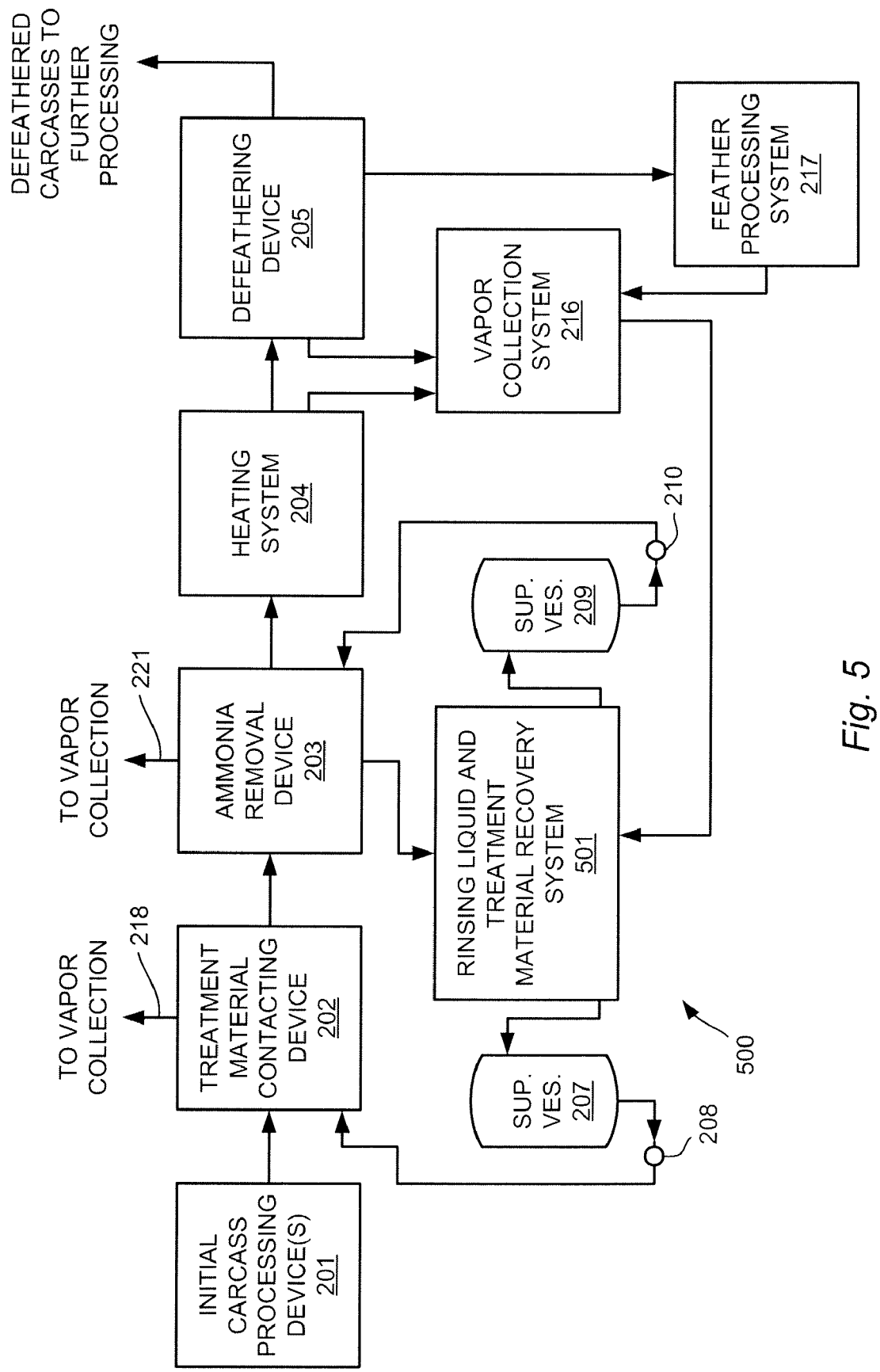
FIG. 5 is a diagrammatic representation of an alternate processing system according to the present invention.

FIG. 5 shows an apparatus 500 that is specifically adapted for applying a treatment material comprising ammonia gas. Apparatus 500 includes many of the same components shown in FIG. 2, and retains the reference numbering for these components. However, because the ammonia-based treatment material applied to the poultry carcasses (not shown) in the apparatus comprises ammonia gas, apparatus 500 does not include a separate treatment material recovery system and rinsing liquid recovery system such as those shown at 212 and 214 in FIG. 2. Rather, apparatus 500 includes a rinsing liquid and treatment material recovery system 501. System 501 receives used rinsing liquid from ammonia removal device 203 similar to rinsing liquid recovery system 214 shown in FIG. 2. However, because gaseous ammonia is applied as the treatment material in treatment material contacting device 202, no liquid material collects in the contacting device and there is no return line for liquids that extends directly to rinsing liquid and treatment material recovery system 501. Any excess ammonia gas that collects in contacting device 202 in the course of operation is drawn off as a gas through vapor collection line 218 to vapor collection system 216. The ammonia collected through vapor collection system 216 is then returned in apparatus 500 to rinsing liquid and treatment material recovery system 501 for processing so that it may ultimately be returned to supply vessel 207. Rinsing liquid and treatment material recovery system 501 includes equipment necessary for cleaning the rinse liquid received from ammonia removal device 203 similarly to the rinsing liquid recovery system 214 shown in FIG. 2. System 501 also includes equipment necessary for returning ammonia to supply vessel 207.

It should be noted that in the case of apparatus 500 shown in FIG. 5, treatment material contacting device 202 may be simply a chamber without any spraying or immersion system. Because the treatment material comprises ammonia gas, the desired contact with the poultry carcasses passing through the chamber comprising contacting device 202 may be achieved simply by maintaining a desired ammonia gas concentration in the atmosphere within contacting device 202.

Figure 6:
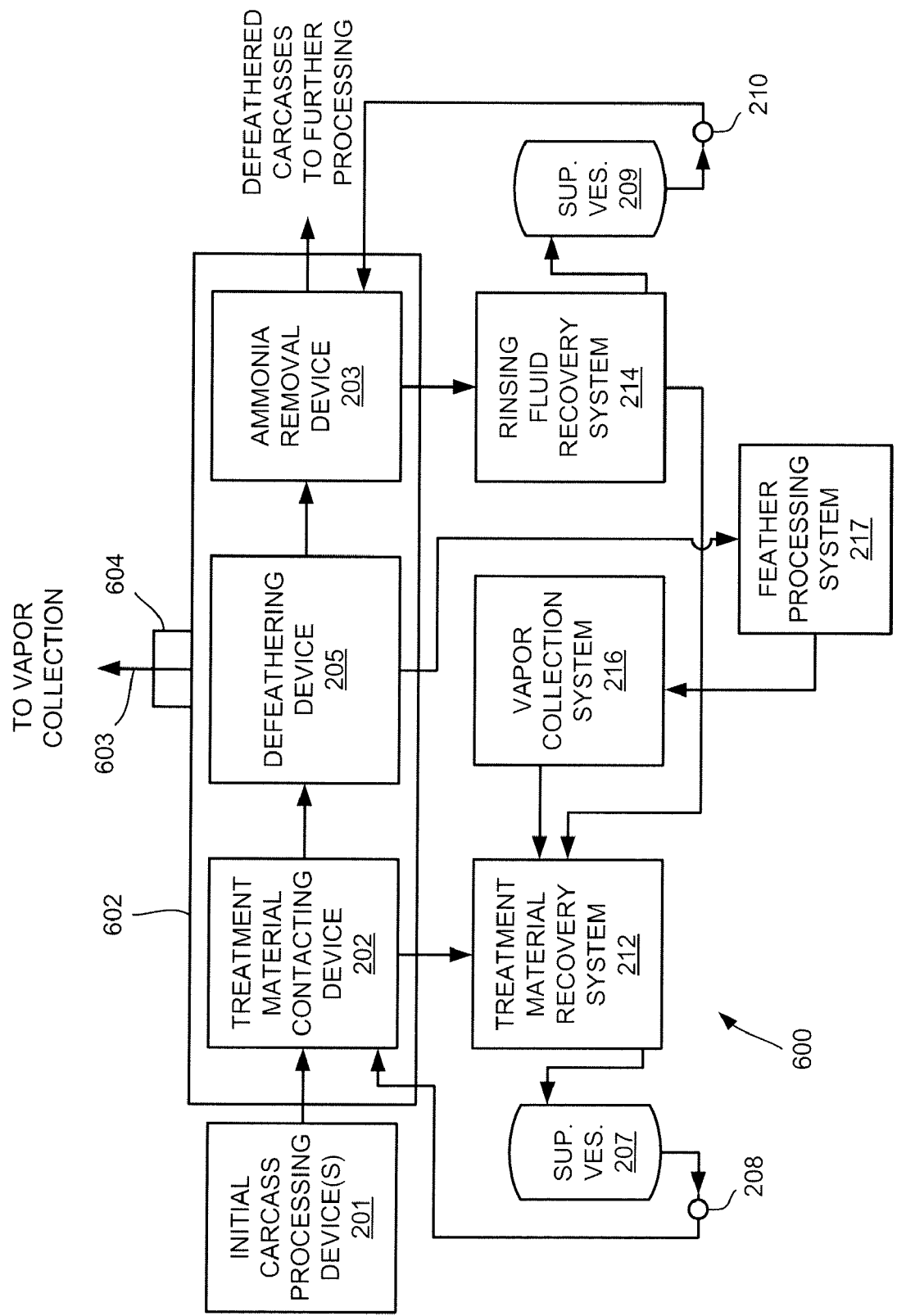
FIG. 6 is a diagrammatic representation of another alternate processing system within the scope of the present invention.

FIG. 6 shows another alternate treatment apparatus 600 within the scope of the present invention. As with apparatus 500 shown in FIG. 5, apparatus 600 also includes many of the same components of apparatus 200 shown in FIG. 2 and the reference numbering from FIG. 2 is retained for these same components. However, apparatus 600 omits heating system 204 shown in FIG. 2, and changes the order of certain components. In particular, ammonia removal device 203 is located after defeathering device 205 in the direction in which the poultry carcasses are transported through apparatus 600. Poultry carcasses in apparatus 600 are first treated in treatment material contacting device 202, then pass directly to defeathering device 205 for defeathering, and then to ammonia removal device 203. It will be noted that apparatus 600 includes a separate treatment material recovery system 212 connected to receive used treatment material from contacting device 202. Thus the arrangement of devices shown in apparatus 600 is particularly suited for use with ammonia-based treatment material in the form of liquid ammonia or ammonium hydroxide solution. It should also be noted that the feather processing system 217 is of particular importance in apparatus 600 because the feathers removed from the carcasses in defeathering device 205 may retain very large amounts of ammonia, particularly where the treatment material comprises an ammonium hydroxide solution.

The arrangement of components shown in FIG. 6 reflects the fact that ammonia need not be rinsed or actively removed from the poultry carcasses until after defeathering. Yet other forms of the invention may include an ammonia removal device such as device 203 both before and after the defeathering device 205. It should also be appreciated that although apparatus 600 omits heating system 204, other forms of the invention may include such a heating system interposed between contacting device 202 and defeathering device 205.

FIG. 6 also shows that treatment material contacting device 202, defeathering device 205, and ammonia removal device 203, may all be housed in a single chamber or vapor collection structure 602. The single area for vapor collection requires only one outlet 603 through which collected vapors or gasses are directed to vapor collection system 216. A single vapor collection structure such as structure 602 in FIG. 6 is particularly suited for systems employing spray-type devices (such as device 300 shown in FIG. 3, but without enclosure 304) for treatment material contacting device 202 and for ammonia removal device 203. In this case, collection structure 602 may comprise an elongated tunnel within which are mounted the spray-type treatment material contacting device 202 and ammonia removal device 203, along with the defeathering device 205. A single continuous conveyor, preferably and overhead conveyor, may be mounted in the tunnel-type collection structure 602 to convey the carcasses the length of the structure. The ends of the tunnel-type collection structure 602 may be open to simplify input and output of carcasses. To avoid loss of ammonia gas through the open ends of collection structure 602, a suitable blower or fan 604 may be mounted at outlet 603 (preferably near the middle of the collection structure) for drawing air in through the open ends and urging ammonia gas released in the structure through outlet 603 and toward vapor collection system 216.

FIGS. 2 and 5 each assume that the various components of the system for placing the poultry carcasses in contact with the ammonia-based treatment material, applying heat to the carcasses as necessary, defeathering the poultry carcasses, and removing ammonia are all separate components, each housed in a respective chamber within which the given process step is performed and from which ammonia gas may be collected. Alternate forms of apparatus 200 and 500 may house the treatment material contacting component, ammonia removal component, heating component (where used), and defeathering component, in a single chamber or vapor collection area, similarly to the arrangement in FIG. 6, which contains ammonia gas that may escape during processing. In yet other forms of the invention, two or more components of the system may be housed in a single chamber of vapor collection area, while the remaining components are housed either in one additional chamber or are each housed in a separate chamber for collecting ammonia. For example, where the ammonia-based treatment material is liquid ammonia or an ammonium hydroxide solution, a contacting device in the form of a spray-type device or an immersion-type device may be housed together in a common chamber with a second spray-type or immersion-type device used for ammonia removal. A heating system (if used) and a defeathering device could both be housed in a common chamber for vapor collection, or each component could be housed in a separate chamber for vapor collection. Only an ammonia-based treatment material comprising ammonia gas would require that the contacting device such as device 202 be housed in a separate chamber. As indicated in FIG. 6, in embodiments in which multiple poultry carcass treatment components are housed within a common chamber, the supporting equipment, such as supply vessels 207 and 209, treatment material recovery system 212, rinsing liquid recovery system 214, vapor collection system 216, and feather processing system 217, would remain essentially unchanged as compared to apparatus 200 shown in FIG. 2.

In another alternate arrangement within the scope of the present invention, active ammonia removal may be performed in the defeathering device employed in the system. For example, a defeathering device may include spray nozzles for spraying a rinsing fluid onto the poultry carcasses while the defeathering operation is performed on the poultry carcass, or before or after defeathering.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention. Ammonia that may be removed from the carcass may also be ammonia that was initially absorbed into the carcass skin, or the feathers, and has released from the carcass by evaporation or some other process.

The invention claimed is:

1. A method of treating a feathered poultry carcass, the method including:
   (a) placing the poultry carcass in contact with an ammonia-based treatment material to modify the pH at the skin of the poultry carcass, wherein the ammonia-based treatment material is a pH increasing material and wherein the pH modification at the skin of the poultry carcass is a pH increase; and
   (b) removing ammonia from the poultry carcass after placing the poultry carcass in contact with the ammonia-based treatment material.

2. The method of claim 1 wherein placing the poultry carcass in contact with the ammonia-based treatment material increases the pH at the skin of the poultry carcass by no less than one-half (0.5) point on the pH scale.

3. The method of claim 1 wherein the removal of ammonia from the poultry carcass is performed as a separate step after initiating defeathering of the poultry carcass.

4. The method of claim 1 wherein the step of removing ammonia from the poultry carcass is initiated prior to initiating defeathering of the poultry carcass.

5. The method of claim 1 further including initiating defeathering of the poultry carcass after placing the poultry carcass in contact with the ammonia-based treatment material and without contacting the poultry carcass with a scald material.

6. The method of claim 1:
   (a) wherein removing ammonia from the poultry carcass includes at least immersing the poultry carcass in water after placing the poultry carcass in contact with the ammonia-based treatment material, the water being held at a temperature of no more than 110° F.; and
   (b) initiating defeathering on the poultry carcass after immersing the poultry carcass in the water and after removing the poultry carcass from the water.

7. The method of claim 1 wherein removing ammonia from the poultry carcass includes applying a rinsing liquid to the poultry carcass.

8. The method of claim 7 wherein the temperature of the rinsing liquid is no more than 110° F.

9. The method of claim 1 further including recovering ammonia from the poultry carcass during a defeathering operation for the poultry carcass.

10. The method of claim 1 wherein the ammonia-based treatment material includes liquid ammonia.

11. The method of claim 10 wherein the liquid ammonia is contained in an immersion vessel and the poultry carcass is placed in contact with the liquid ammonia by immersing the poultry carcass in the liquid ammonia contained in the immersion vessel.

12. The method of claim 11 wherein the poultry carcass is immersed in the liquid ammonia for no less than approximately 2 seconds.

13. The method of claim 10 wherein the liquid ammonia is sprayed on to the poultry carcass.

14. The method of claim 1 wherein the ammonia-based treatment material includes gaseous ammonia.

15. The method of claim 1 wherein the ammonia-based treatment material includes an ammonium hydroxide solution.

16. The method of claim 15 wherein the ammonium hydroxide solution is contained in an immersion vessel and the poultry carcass is placed in contact with the ammonium hydroxide solution by immersing the poultry carcass in the ammonium hydroxide solution contained in the immersion vessel.

17. The method of claim 15 wherein the poultry carcass is placed in contact with the ammonium hydroxide solution by spraying the ammonium hydroxide solution on to the poultry carcass.

18. The method of claim 15 wherein the ammonium hydroxide solution is at a temperature of no more than −45° F. when it is initially placed in contact with the poultry carcass.

19. An apparatus including:
   (a) a treatment material supply;
   (b) a contacting device connected to receive an ammonia-based treatment material from the treatment material supply, the contacting device for placing the ammonia-based treatment material in contact with a feathered poultry carcass, the ammonia-based treatment material comprising a pH increasing material which is effective to produce a pH increase at the skin of the feathered poultry carcass;

(c) a poultry carcass defeathering device;

(d) an ammonia removal device for receiving the feathered poultry carcass after having been placed in contact with the ammonia-based treatment material by the contacting device, and for removing ammonia from the feathered poultry carcass; and (e) a conveying system for conveying the feathered poultry carcass from the contacting device to the poultry carcass defeathering device and ammonia removal device.

20. The apparatus of claim 19 further including an ammonia vapor collection system connected to receive ammonia gas from at least the ammonia removal device and to separate the received ammonia gas from one or more other gasses mixed with the ammonia gas.

21. The apparatus of claim 19 further including a feather collection device for removing feathers from the poultry carcass defeathering device and recovering ammonia from the feathers.

22. A method of treating a feathered poultry carcass, the method including:

(a) placing the poultry carcass in contact with an ammonia-based treatment material to modify the pH at the skin of tile poultry carcass, wherein placing the poultry carcass in contact with the ammonia-based treatment material increases the pH at the skin of the poultry carcass by no less than one-half (0.5) point on the pH scale; and (b) removing ammonia from the poultry carcass after placing the poultry carcass in contact with the ammonia-based treatment material.

\* \* \* \* \*